Patented Mar. 14, 1933

1,901,486

UNITED STATES PATENT OFFICE

CARL WURSTER, OF LUDWIGSHAFEN-ON-THE-RHINE, AND MAX GRUBER, OF MANNHEIM, GERMANY, ASSIGNORS TO I. G. FARBENINDUSTRIE AKTIENGESELLSCHAFT, OF FRANKFORT-ON-THE-MAIN, GERMANY

PURE ANHYDROUS ALUMINIUM CHLORIDE

No Drawing. Application filed February 10, 1931, Serial No. 514,907, and in Germany February 14, 1930.

The present invention relates to the production of pure anhydrous aluminium chloride from crude aluminium chloride contaminated with iron compounds.

We have found that pure aluminium chloride free from iron is obtained by bringing crude aluminium chloride containing iron chloride into contact with a melt containing aluminium chloride and alkali metal or alkaline earth metal chloride or several of such chlorides, kept at a temperature at which aluminium chloride sublimes, in the presence of a reducing agent, and withdrawing the subliming aluminium chloride. It is preferable to employ melts which contain less than 1 molecular proportion of alkali metal or alkaline earth metal chloride to each molecular proportion of aluminium chloride.

The purification of the crude chloride may be carried out for example by continuously subliming or introducing crude aluminium chloride into the melt, which for example contains chips of aluminium, the purified chloride being sublimed off again. Instead of chips of aluminium, other reducing agents, as for example chips of iron, may be employed, or reducing gases may be led into the melt. The iron or ferrous chloride which separates out may be removed mechanically (for example by filtration or decantation) or magnetically. Vapour of crude aluminium chloride mixed with a gaseous reducing agent, such for example as hydrogen, may also be led through the melt. In this manner for example a product containing 0.04 per cent of iron or less may be obtained without difficulty from an aluminium chloride having a content of iron chloride of several per cent.

Contrary to expectation according to the present invention iron may be directly removed from vapours of aluminium chloride containing iron chloride such as are obtained by chlorinating materials containing alumina. Such vapours contain carbon dioxide as well as aluminium and iron chlorides. If attempts are made to remove the iron from such vapours by passing them at about 400° C. over a layer of chips of aluminium, the latter are oxidized by the carbon dioxide and lose their activity after a short period of time. If, however, the vapours are allowed to flow at approximately the same temperature through a melt containing chips of aluminium and which contains for example from 0.5 to 0.65 molecular proportion of sodium chloride to each molecular proportion of aluminium chloride, this melt dissolves the iron chloride contained in the aluminium chloride vapours while simultaneously reducing it to ferrous chloride or iron; the chips of aluminium are not attacked by the carbon dioxide. The melts are regulated as regards their composition so that as much aluminium chloride sublimes off as is supplied, that is melts are employed the vapour pressure of which in aluminium chloride practically corresponds to the partial pressure of aluminium chloride in the reaction mixture. The chlorine present in the iron chloride combines with aluminium with the formation of aluminium chloride and is thus directly utilized.

The following example will further illustrate how the said invention may be carried out in practice, but the invention is not restricted to this example.

Example

A vessel of about 0.7 cubic metre capacity about half filled from 500 to 700 kilograms of a melt which consists of about 4 parts by weight of aluminium chloride and 1 part by weight of sodium chloride is heated electrically to keep the melt at a temperature of about 350° C. Aluminium chips are present in the melt to the extent of about 20 to 40 per cent by weight of the melt.

A gas mixture containing aluminium chloride, iron chloride and carbon dioxide issuing from a furnace in which bauxite is acted upon with chloride and carbon monoxide is led into the melt by means of a pipe which dips deeply into the melt in the vessel. The said gas mixture is sucked through the vessel so that it bubbles through the melt. Several cyclones and separators are attached to the vessel in which the aluminium chloride vapours leaving the melt are separated. The residual gas, which mainly consists of carbon dioxide, is sucked off and removed. The throughput through the vessel is regulated by the reduced pressure on the cyclone side of the vessel so that about 10 kilograms of aluminium chloride are separated per hour. A commercial aluminium chloride free from iron is obtained, the iron content of which amounts to about 0.07 per cent. After operating for long periods of time it is preferable to disturb the chips by occasional stirring. When an increase in the iron content of the final product indicates that the aluminium chips are used up, free chips are introduced.

Aluminium chloride may be obtained in a similar manner from gases which contain impure aluminium chloride from any source, especially those obtained by chlorinating impure aluminium scrap containing iron.

What we claim is:—

1. A process of producing pure anhydrous aluminium chloride, which comprises bringing crude aluminium chloride containing iron chloride into contact with a melt containing aluminium chloride and a chloride of a metal selected from the group consisting of alkali and alkaline earth metals, kept at a temperature at which aluminium chloride sublimes, in the presence of a reducing agent, and withdrawing the subliming aluminium chloride.

2. A process claimed in claim 1 in which the melt contains less than 1 molecular proportion of a chloride of a metal selected from the group consisting of alkali and alkaline earth metals for each 1 molecular proportion of aluminium chloride.

3. A process of producing pure anhydrous aluminium chloride, which comprises bringing crude aluminium chloride containing iron chloride into contact with a melt containing aluminium chloride and a chloride of a metal selected from the group consisting of alkali and alkaline earth metals, kept at a temperature at which aluminium chloride sublimes and containing metallic aluminium, and withdrawing the subliming aluminium chloride.

4. A process of producing pure anhydrous aluminium chloride, which comprises passing a gas mixture containing aluminium chloride, iron chloride and carbon dioxide into a melt consisting of about 4 parts by weight of aluminium chloride and 1 part by weight of sodium chloride, containing metallic aluminium and kept at a temperature of about 350° C., and withdrawing the subliming aluminium chloride.

In testimony whereof we have hereunto set our hands.

CARL WURSTER.
MAX GRUBER.